(12) United States Patent
Klemen

(10) Patent No.: US 7,008,347 B2
(45) Date of Patent: Mar. 7, 2006

(54) SINGLE OVERDRIVE SIX-SPEED TRANSMISSION WITH LOW INTERNAL SPEEDS

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 118 days.

(21) Appl. No.: 10/819,449

(22) Filed: Apr. 7, 2004

(65) Prior Publication Data

US 2005/0227807 A1    Oct. 13, 2005

(51) Int. Cl.
F16H 3/44    (2006.01)
(52) U.S. Cl. .................. 475/296; 475/276; 475/330; 475/284
(58) Field of Classification Search ........ 475/275–292, 475/297, 311–325, 330
See application file for complete search history.

(56) References Cited

U.S. PATENT DOCUMENTS

| 4,070,927 | A | 1/1978 | Polak ..................... 74/765 |
| 4,709,594 | A | 12/1987 | Maeda ..................... 74/753 |
| 5,106,352 | A | 4/1992 | Lepelletier ............... 475/280 |
| 5,599,251 | A | 2/1997 | Beim et al. .............. 475/275 |
| 6,053,839 | A | 4/2000 | Baldwin et al. .......... 475/281 |
| 6,071,208 | A | 6/2000 | Koivunen ................. 475/275 |
| 6,083,135 | A | 7/2000 | Baldwin et al. .......... 475/276 |
| 6,425,841 | B1 * | 7/2002 | Haka ..................... 475/275 |
| 6,558,287 | B1 * | 5/2003 | Hayabuchi et al. ......... 475/271 |
| 6,634,981 | B1 * | 10/2003 | Raghavan et al. .......... 475/275 |
| 6,659,903 | B1 * | 12/2003 | Bucknor et al. ............ 475/276 |
| 6,659,904 | B1 * | 12/2003 | Usoro et al. ............... 475/276 |
| 6,672,987 | B1 * | 1/2004 | Raghavan et al. .......... 475/269 |
| 6,672,988 | B1 * | 1/2004 | Raghavan et al. .......... 475/276 |
| 6,767,306 | B1 * | 7/2004 | Raghavan et al. .......... 475/275 |
| 6,887,178 | B1 * | 5/2005 | Miyazaki et al. .......... 475/276 |
| 6,910,985 | B1 * | 6/2005 | Ishimaru et al. ........... 475/275 |
| 2003/0083174 | A1 * | 5/2003 | Tabata et al. ............... 475/323 |
| 2004/0097324 | A1 * | 5/2004 | Ziemer ..................... 475/296 |
| 2004/0116238 | A1 * | 6/2004 | Ziemer ..................... 475/296 |
| 2004/0248684 | A1 * | 12/2004 | Sugiura et al. .............. 475/31 |
| 2005/0119089 | A1 * | 6/2005 | Gumpottsberger .......... 475/296 |
| 2005/0130791 | A1 * | 6/2005 | Raghavan et al. .......... 475/296 |
| 2005/0176552 | A1 * | 8/2005 | Bucknor et al. ............ 475/275 |

* cited by examiner

Primary Examiner—Tisha Lewis
(74) Attorney, Agent, or Firm—Christopher DeVries

(57) ABSTRACT

A six-speed transmission includes an input shaft, an output shaft, and a planetary gear arrangement having first, second and third planetary gear sets, each planetary gear set having first, second and third members. First and second interconnecting members continuously interconnect members of the planetary gear sets. The six torque-transmitting mechanisms are engaged in combinations of two to establish six forward speed ratios and at least one reverse speed ratio between the input shaft and the output shaft. The second and third sun gears hold the reaction torque in the first through fourth speeds, resulting in low planetary gear loading, which provides small gear sets, reduced clutch loading, reduced internal speeds, and low losses.

20 Claims, 3 Drawing Sheets

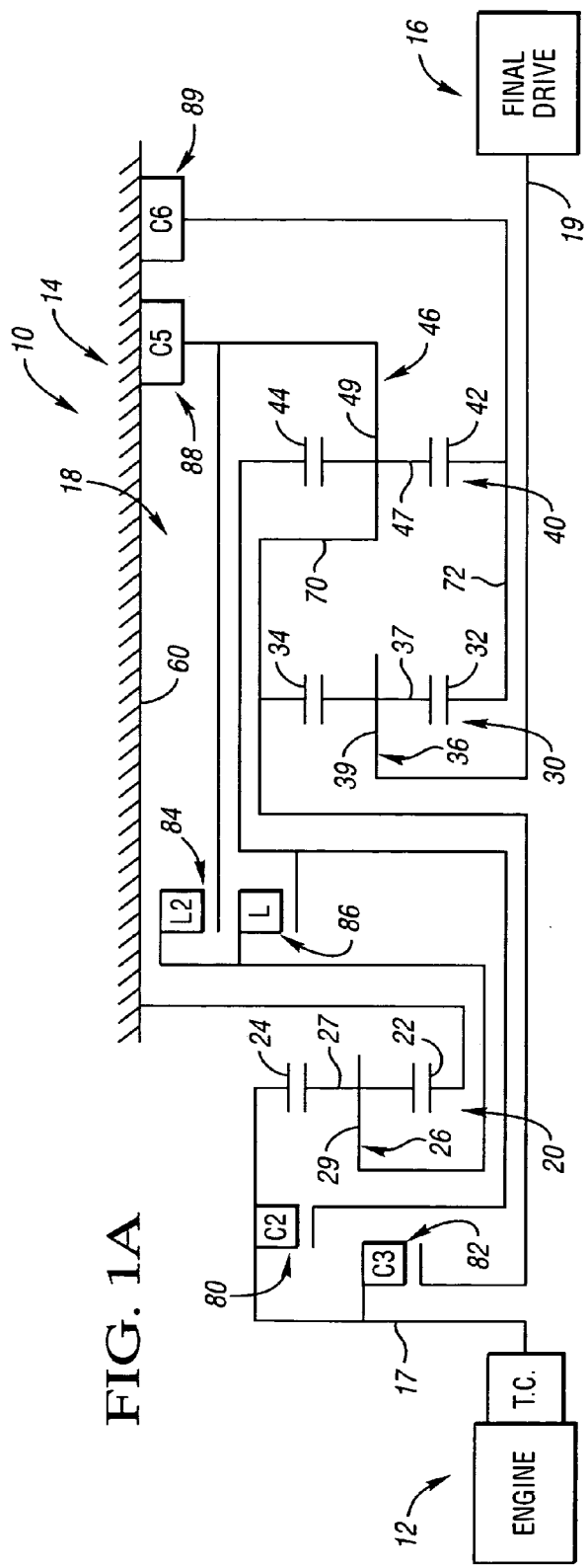

| SIX CLUTCH SIX SPEED | | | | |
|---|---|---|---|---|
| REV 2 | -2.186 | | C2(280) | C5(288) |
| REV 1 | -5.563 | | L(286) | C5(288) |
| | RATIO | STEP | CLUTCHES | |
| 1 FIRST | 5.649 | | L(286) | C6(286) |
| 2 SECOND | 3.520 | 1.60 | L2(284) | C6(289) |
| 3 THIRD | 2.219 | 1.59 | C2(280) | C6(289) |
| 4 FOURTH | 1.383 | 1.60 | C3(282) | C6(289) |
| 5 FIFTH | 1.000 | 1.38 | C3(282) | C2(280) |
| 6 SIXTH | 0.783 | 1.28 | C3(282) | L(286) |
| TOTAL RATIO COVERAGE | 7.218 | | | |

000
SINGLE OVERDRIVE SIX-SPEED TRANSMISSION WITH LOW INTERNAL SPEEDS

TECHNICAL FIELD

The present invention relates to a six-speed transmission having six torque-transmitting mechanisms which are engaged in combinations of two to provide at least one reverse speed ratio and six forward speed ratios.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four-and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

SUMMARY OF THE INVENTION

The invention provides an improved six-speed transmission having relatively low sun gear loading, which enables small gear sets, reduced clutch loading, reduced internal speeds, and reduced losses.

The six-speed transmission includes six torque-transmitting mechanisms that are engaged in combinations of two to provide at least one reverse speed ratio and six forward speed ratios. The transmission is arranged to provide two dual clutch rotating modules to ensure good cooling on every shift. Medium, wide and narrow overall ratios are available with the different embodiments described. Also, because planetary gear loading is low, a fine tooth quiet planetary module design is achieved.

More specifically, the invention provides a six-speed transmission including an input shaft, an output shaft, and a planetary gear arrangement having first, second and third planetary gear sets, each planetary gear set having first, second and third members. The input shaft is continuously connected with the first member of the first planetary gear set, and the output shaft is continuously connected with the second member of the second planetary gear set. A first interconnecting member continuously connects the first member of the second planetary gear set with the second member of the third planetary gear set. A second interconnecting member continuously connects the third member of the second planetary gear set with the third member of the third planetary gear set. The third member of the first planetary gear set is continuously connected with a stationary member. A first torque-transmitting mechanism selectively connects the first member of the first planetary gear set with the first member of the third planetary gear set. A second torque-transmitting mechanism selectively connects the first member of the first planetary gear set with the first member of the second planetary gear set. A third torque-transmitting mechanism selectively connects the second member of the first planetary gear set with the second member of the third planetary gear set. A fourth torque-transmitting mechanism selectively connects the second member of the first planetary gear set with the first member of the third planetary gear set. A fifth torque-transmitting mechanism selectively connects the second member of the third planetary gear set with the stationary member. A sixth torque-transmitting mechanism selectively connects the third member of the third planetary gear set with the stationary member.

A first forward speed ratio is established with the engagement of the fourth and sixth torque-transmitting mechanisms; a second forward speed ratio is established with the engagement of the third and sixth torque-transmitting mechanisms; a third forward speed ratio is established with the engagement of the first and sixth torque-transmitting mechanisms; a fourth forward speed ratio is established with the engagement of the second and sixth torque-transmitting mechanisms; a fifth forward speed ratio is established with the engagement of the second and first torque-transmitting mechanisms; a sixth forward speed ratio is established with the engagement of the second and fourth torque-transmitting mechanisms; and a reverse speed ratio is established with the engagement of the fourth and fifth torque-transmitting mechanisms.

In one embodiment, each of the first members is a ring gear, each of the second members is a planet carrier assembly member, and each of the third members is a sun gear. In this embodiment, the ring gear of the first planetary gear set has 85 teeth, the sun gear of the first planetary gear set has 55 teeth; the ring gear of the second planetary gear set has 81 teeth; the sun gear of the second planetary gear set has 21 teeth; the ring gear of the third planetary gear set has 81 teeth; and the sun gear of the third planetary gear set has 29 teeth.

In another embodiment of the invention, the first, second and third members of the first planetary gear set are a planet carrier assembly member, a ring gear and a sun gear, respectively, and the first, second and third members of the second and third planetary gear sets are a ring gear, a planet carrier assembly member and a sun gear, respectively. In this embodiment, the ring gear of the first planetary gear set has 81 teeth; the sun gear of the first planetary gear set has 41 teeth; the ring gear of the second planetary gear set has 81 teeth; the sun gear of the second planetary gear set has 23 teeth; the ring gear of the third planetary gear set has 81 teeth; and the sun gear of the third planetary gear set has 35 teeth.

In a further embodiment, the first, second and third members of the first planetary gear set are a sun gear, a planet carrier assembly member and a ring gear, respectively, and the first, second and third members of the second and third planetary gear sets are a ring gear, a planet carrier assembly member and a sun gear, respectively. In this embodiment, the ring gear of the first planetary gear set has 85 teeth; the sun gear of the first planetary gear set has 55 teeth; the ring gear of the second planetary gear set has 81 teeth; the sun gear of the second planetary gear set has 31 teeth; the ring gear of the third planetary gear set has 81 teeth; and the sun gear of the third planetary gear set has 49 teeth.

The first, second and third planetary gear sets may all be simple planetary gear sets. Alternatively, the first planetary gear set is a compound planetary gear set, and the second and third planetary gear sets are simple planetary gear sets.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1a is a stick diagram of a transmission in accordance with the invention;

FIG. 1b is a truth table corresponding with the transmission of FIG. 1a;

FIG. 2a is a stick diagram of a transmission in accordance with a first alternative embodiment of the invention;

FIG. 2b is a truth table corresponding with the transmission of FIG. 2a;

FIG. 3a is a stick diagram of a transmission in accordance with a second alternative embodiment of the invention; and FIG. 3b is a truth table corresponding with the transmission of FIG. 3a.

DESCRIPTION OF THE PREFERRED EMBODIMENTS

Figures 2A, 2B:
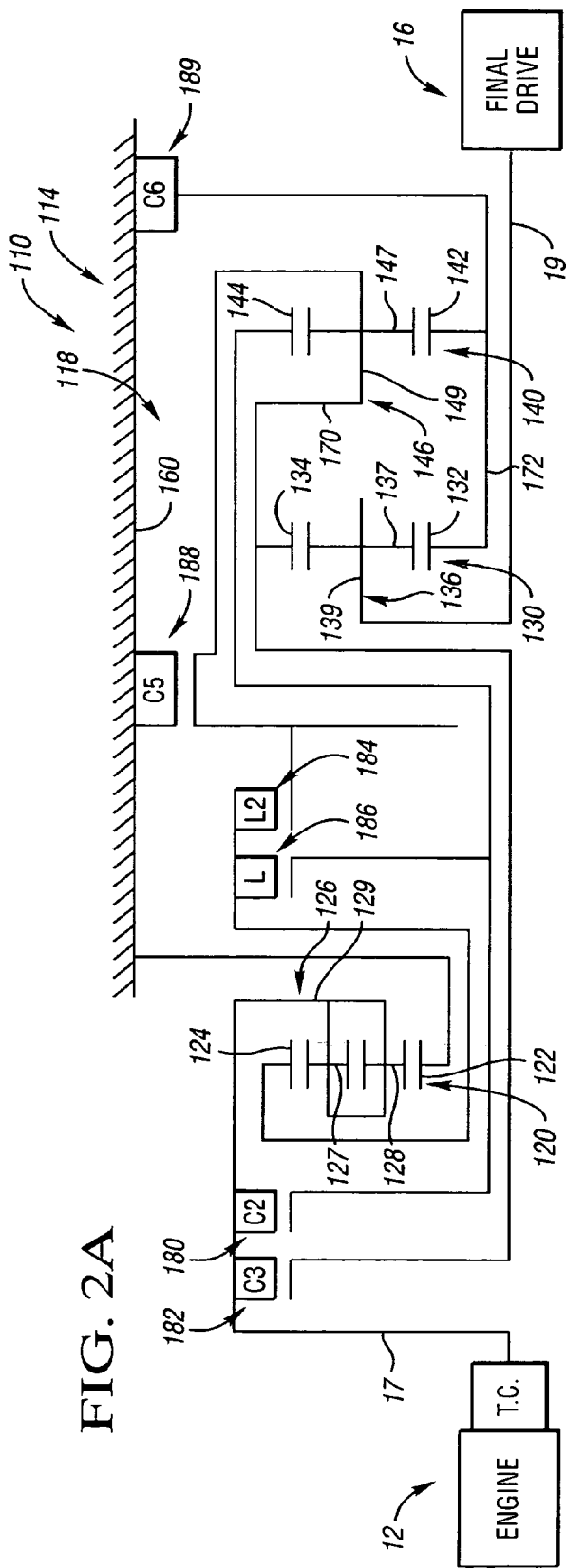

Referring to FIG. 1a, a stick diagram is shown for a narrow or close ratio transmission in accordance with the invention. As shown in FIG. 1a, a powertrain 10 includes a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24 and planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34 and a planet carrier assembly member 36. The planet carrier assembly member 36 includes a plurality of pinion gears 37 rotatably mounted on a carrier member 39 and disposed in meshing relationship with both the sun gear member 32 and the ring member 34.

The planetary gear set 40 includes a sun gear member 42, a ring gear member 44 and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

In this embodiment, each of the planetary gear sets 20, 30 and 40 are simple planetary gear sets.

The planetary gear arrangement 18 also includes six torque-transmitting mechanisms 80, 82, 84, 86, 88, 89. The torque-transmitting mechanisms 80, 82, 84, 86 are rotating-type torque-transmitting mechanisms, commonly termed clutches. The torque-transmitting mechanisms 88, 89 are stationary-type torque-transmitting mechanisms, commonly termed brakes or reaction clutches.

The input shaft 17 is continuously connected with the ring gear member 24, and the output shaft 19 is continuously connected with the planet carrier assembly member 36. A first interconnecting member 70 continuously connects the ring gear member 34 with the planet carrier assembly member 46. A second interconnecting member 72 continuously connects the sun gear member 32 with the sun gear member 42. The sun gear member 22 is continuously connected with the transmission housing 60.

As referred to in the claims, the planetary gear set 20 is the first planetary gear set, the planetary gear set 30 is the second planetary gear set, and the planetary gear set 40 is the third planetary gear set. Also referenced in the claims are first, second and third members of each planetary gear set. In this embodiment, each first member is a ring gear, each second member is a planet carrier assembly member, and each third member is a sun gear. Also, the torque-transmitting mechanism 80 is referred to as the first torque-transmitting mechanism, the torque-transmitting mechanism 82 is the second torque-transmitting mechanism, the torque-transmitting mechanism 84 is the third torque-transmitting mechanism, the torque-transmitting mechanism 86 is the fourth torque-transmitting mechanism, the torque-transmitting mechanism 88 is the fifth torque-transmitting mechanism, and the torque-transmitting mechanism 89 is the sixth torque-transmitting mechanism.

The ring gear member 24 is selectively connectable with the ring gear member 44 through the clutch 80. The ring gear member 24 is selectively connectable with the ring gear member 34 through the clutch 82. The planet carrier assembly member 26 is selectively connectable with the planet carrier assembly member 46 through the clutch 84. The planet carrier assembly member 26 is selectively connectable with the ring gear member 44 through the clutch 86. The planet carrier assembly member 46 is selectively connectable with the transmission housing 60 through the brake 88. The sun gear member 42 is selectively connectable with the transmission housing 60 through the brake 89.

As shown in the truth table of FIG. 1b, the torque-transmitting mechanisms 80, 82, 84, 86, 88, 89 are selectively engaged in combinations of two to provide six forward speed ratios and two reverse speed ratios. It should be noted that each of the speed shifts is a single transition shift.

To establish the reverse #2 speed ratio, the clutch 80 and brake 88 are engaged. The overall numerical value of the reverse #2 speed ratio is −1.739, as indicated in the truth table of FIG. 1b.

To establish the reverse #1 speed ratio, the clutch 86 and brake 88 are engaged. The overall numerical value of the reverse #1 speed ratio is −2.864, as indicated in the truth table.

The first forward speed ratio is established with the engagement of the clutch 86 and the brake 89. The overall numerical value of the first forward speed ratio is 2.817, as indicated in the truth table.

The second forward speed ratio is established with the engagement of the clutch 84 and the brake 89. The overall numerical value of the second forward speed ratio is 2.074, as indicated in the truth table.

The third forward speed ratio is established with the engagement of the clutch 80 and brake 89. The overall numerical value of the third forward speed ratio is 1.710, as indicated in the truth table.

The fourth forward speed ratio is established with the engagement of the clutch 82 and brake 89. The overall numerical value of the fourth forward speed ratio is 1.259, as indicated in the truth table.

The fifth forward speed ratio is established with the engagement of the clutches 80 and 82. The overall numerical value of the fifth forward speed ratio is 1, as indicated in the truth table.

The sixth forward speed ratio is established with the engagement of the clutches 82 and 86. The overall numerical value of the sixth forward speed ratio is 0.816, as indicated in the truth table.

As set forth above, the engagement schedules of the torque-transmitting mechanisms are shown in the truth table of FIG. 1b. This table also provides an example of speed ratios that are available using preferred ring gear/sun gear tooth ratios. The ring gear/sun gear tooth ratio of the planetary gear set 20 is preferably 85/55; the ring gear/sun gear tooth ratio of the planetary gear set 30 is preferably 81/21; and the ring gear/sun gear tooth ratio of the planetary gear set 40 is preferably 81/29. The truth table of FIG. 1b also describes the ratio steps that are attained using the sample tooth ratios given. For example, the step ratio between the first and second forward ratios is 1.36. Again, as illustrated in the truth table of FIG. 1b, all of the single step forward ratio interchanges are of the single transition variety. The overall ratio of the transmission of FIG. 1a is 3.453, as indicated in the truth table.

Turning to FIGS. 2a and 2b, an alternative embodiment of a powertrain 110 is shown in accordance with the invention. This embodiment is in most respects similar to that of FIG. 1a, except that the first planetary gear set has been reconfigured as a compound planetary gear set. Like reference numbers are used to refer to like components in FIGS. 1a and 2a. As shown in FIG. 2a, a powertrain 110 includes a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 is a compound planetary gear set, and includes a sun gear member 122, a ring gear member 124, and a planetary gear set 126. The planetary gear set 126 includes a plurality of pinion gears 127, 128 rotatably mounted on carrier member 129. The pinion gears 127 are in meshing engagement with the ring gear member 124, and the pinion gears 128 are in meshing engagement with the sun gear member 122.

The planetary gear set 130 includes a sun gear member 132, a ring gear member 134, and a planetary gear set 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 in meshing engagement with the ring gear 144 and the sun gear member 142.

The planetary gear arrangement 118 also includes six torque-transmitting mechanisms 180, 182, 184, 186, 188, and 189. The torque-transmitting mechanisms 180, 182, 184 and 186 are rotating-type torque-transmitting mechanisms, and the torque-transmitting mechanisms 188 and 189 are brakes.

The input shaft 17 is continuously connected with the planet carrier assembly member 126, and the output shaft 19 is continuously connected with the planet carrier assembly member 136. A first interconnecting member 170 continuously connects the ring gear member 134 with the planet carrier assembly member 146. A second interconnecting member 172 continuously connects the sun gear member 132 with the sun gear member 142. The sun gear member 122 is continuously connected with the transmission housing 160.

As referred to in the claims, the first, second and third planetary gear sets are the planetary gear sets 120, 130 and 140, respectively. The planet carrier assembly member 126 is the first member of the first planetary gear set 120, the ring gear member 124 is the second member of the first planetary gear set 120, and the sun gear member 122 is the third member of the first planetary gear set 120. In the planetary gear sets 130, 140, the first, second and third members are ring gear members, planet carrier assembly members, and sun gear members, respectively.

The planet carrier assembly member 126 is selectively connectable with the ring gear member 144 through the clutch 180. The planet carrier assembly member 126 is selectively connectable with the ring gear member 134 through the clutch 182. The ring gear member 124 is selectively connectable with the planet carrier assembly member 146 through the clutch 184. The ring gear member 124 is selectively connectable with the ring gear member 144 through the clutch 186. The planet carrier assembly member 146 is selectively connectable with the transmission housing 160 through the brake 188. The sun gear member 142 is selectively connectable with the transmission housing 160 through the brake 189.

The reverse #2, reverse #1, first, second, third, fourth, fifth and sixth speeds are achieved by the clutching engagements shown in the truth table shown in FIG. 2b, which is the same as that of FIG. 1b described previously. The truth table of FIG. 2b also provides examples of speed ratios that are available using preferred ring gear/sun gear tooth ratios. The speed ratios illustrated in FIG. 2b correspond with the following ring gear/sun gear tooth ratios: the ring gear/sun gear tooth ratio of the planetary gear set 120 is 81/41; the ring gear/sun gear tooth ratio of the planet carrier assembly member 130 is 81/23; and the ring gear/sun gear tooth ratio of the planet carrier assembly member 140 is 81/35. The truth table of FIG. 2b also describes the ratio steps that are attained utilizing the sample tooth ratios given. For example, the step ratio between the first and second forward speed ratios is 1.43. The overall ratio for this transmission is 4.68 as indicated in the truth table. Like the embodiment of FIG. 1b, it can also be readily determined from the truth table of FIG. 2b that all of the single step forward ratio interchanges are of the single transition variety.

Figures 3A, 3B:
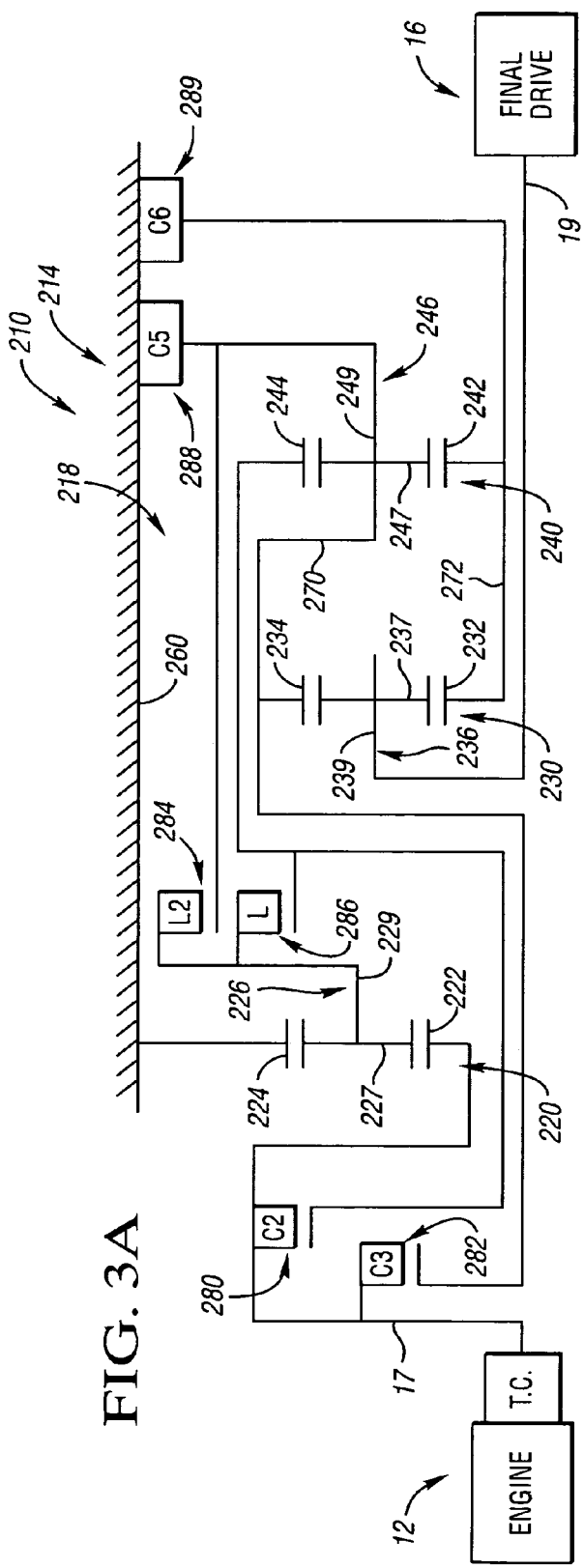

Turning to FIGS. 3a and 3b, a second alternative embodiment of the invention is shown. This embodiment is similar to that of FIG. 1a, except that the connections for the first planetary gear set have been rearranged. The sequence of operation described in the truth table of FIG. 3b is the same as that of FIGS. 1b and 2b. Again, like reference numbers are used to refer to like components in FIGS. 1a, 2a and 3a.

As shown in FIG. 3a, a powertrain 210 includes a conventional engine and torque converter 12, a planetary transmission 21, and a conventional final drive mechanism 16.

The planetary transmission 214 includes an input shaft 17 continuously connected with the engine and torque converter 12, a planetary gear arrangement 218, and output shaft 19 continuously connected with the final drive mechanism 16. The planetary gear arrangement 218 includes three planetary gear set 220, 230 and 240.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

Each of the planetary gear sets 220, 230 and 240 is a simple planetary gear set.

The planetary gear arrangement 218 also includes six torque-transmitting mechanisms 280, 282, 284, 286, 288, and 289. The torque-transmitting mechanisms 280, 282, 284 and 286 are rotating-type torque-transmitting mechanisms, commonly termed clutches, and the torque-transmitting mechanisms 288, 289 are stationary-type torque-transmitting mechanisms, commonly termed brakes or reaction clutches.

The input shaft 17 is continuously connected with the sun gear member 222, and the output shaft 19 is continuously connected with the planet carrier assembly member 236. A first interconnecting member 270 continuously connects the ring gear member 234 with the planet carrier assembly member 246. A second interconnecting member 272 continuously connects the sun gear member 232 with the sun gear member 242. The ring gear member 224 is continuously connected with the transmission housing 260.

As referred to in the claims, the first, second and third planetary gear sets are the planetary gear sets 220, 230 and 240, respectively. The sun gear member 222 is the first member of the first planetary gear set, the planet carrier assembly member 226 is the second member of the first planetary gear set, and the ring gear member 224 is the third member of the first planetary gear set. In the planetary gear sets 230 and 240, the first, second and third members are the ring gear member, planet carrier assembly member, and sun gear member, respectively.

The sun gear member 222 is selectively connectable with the ring gear member 244 through the clutch 280. The sun gear member 222 is selectively connectable with the ring gear member 234 through the clutch 282. The planet carrier assembly member 226 is selectively connectable with the planet carrier assembly member 246 through the clutch 284. The planet carrier assembly member 226 is selectively connectable with the ring gear member 244 through the clutch 286. The planet carrier assembly member 246 is selectively connectable with the transmission housing 260 through the brake 288. The sun gear member 242 is selectively connectable with the transmission housing 260 through the brake 289.

As shown in the truth table of FIG. 3b, the torque-transmitting mechanisms 280, 282, 284, 286, 288 and 289 are selectively engaged in combinations of two to provide six forward speed ratios and two reverse speed ratios, in the same sequence of engagement described previously with respect to FIGS. 1b and 2b. The table also provides an example of speed ratios that are available using the following ring gear/sun gear tooth ratios, given by way of example: the ring gear/sun gear tooth ratio of the planetary gear set 220 is 85/55; the ring gear/sun gear tooth ratio of the planetary gear set 230 is 81/31; and the ring gear/sun gear tooth ratio of the planetary gear set 240 is 81/49. The truth table of FIG. 3b also describes the ratio steps that are attained utilizing the sample tooth ratios given. For example, the step ratio between the first and second forward ratios is 1.60. The overall ratio for this wide ratio six speed is 7.218, as indicated in the truth table.

Accordingly, the various embodiments of the invention described by way of example provide wide, medium and narrow ratio transmissions which are compatible with high speed, low torque engines. Because the sun gears of the second and third planetary gear sets are grounded in the first through fourth speed ratios, planetary gear loading is low, enabling fine tooth quiet planetary module design. Clutch loading is also very low, enabling a compact design and a small transmission diameter.

While the best modes for carrying out the invention have been described in detail, the those familiar with the art to which this invention relates will recognize various alternative designs and embodiments for practicing the invention within the scope of the appended claims.

What is claimed is:
1. A multi-speed transmission comprising:
an input shaft;
an output shaft;
a planetary gear arrangement having first, second and third planetary gear sets, each planetary gear set having first, second and third members;
said input shaft being continuously interconnected with said first member of said first planetary gear set, and said output shaft being continuously interconnected with said second member of said second planetary gear set;

a first interconnecting member continuously interconnecting said first member of said second planetary gear set with said second member of said third planetary gear set;

a second interconnecting member continuously interconnecting said third member of said second planetary gear set with said third member of said third planetary gear set;

said third member of said first planetary gear set being continuously connected with a stationary member;

a first torque-transmitting mechanism selectively interconnecting said first member of said first planetary gear set with said first member of said third planetary gear set;

a second torque-transmitting mechanism selectively interconnecting said first member of said first planetary gear set with said first member of said second planetary gear set;

a third torque-transmitting mechanism selectively interconnecting said second member of said first planetary gear set with said second member of said third planetary gear set;

a fourth torque-transmitting mechanism selectively interconnecting said second member of said first planetary gear set with said first member of said third planetary gear set;

a fifth torque-transmitting mechanism selectively interconnecting said second member of said third planetary gear set with said stationary member; and a sixth torque-transmitting mechanism selectively interconnecting said third member of said third planetary gear set with said stationary member;

wherein said six torque-transmitting mechanisms are engaged in combinations of two to provide at least one reverse speed ratio and six forward speed ratios.

2. The transmission of claim 1, wherein a first forward speed ratio is established with the engagement of said fourth and sixth torque-transmitting mechanisms; a second forward speed ratio is established with the engagement of said third and sixth torque-transmitting mechanisms; a third forward speed ratio is established with the engagement of said first and sixth torque-transmitting mechanisms; a fourth forward speed ratio is established with the engagement of said second and sixth torque-transmitting mechanisms; a fifth forward speed ratio is established with the engagement of said second and first torque-transmitting mechanisms; a sixth forward speed ratio is established with the engagement of said second and fourth torque-transmitting mechanisms; and a reverse speed ratio is established with the engagement of said fourth and fifth torque-transmitting mechanisms.

3. The transmission of claim 1, wherein said first, second and third planetary gear sets are simple planetary gear sets.

4. The transmission of claim 1, wherein said first planetary gear set is a compound planetary gear set, and said second and third planetary gear sets are simple planetary gear sets.

5. The transmission of claim 1, wherein each of said first members is a ring gear, each of said second members is a planet carrier assembly member, and each of said third members is a sun gear.

6. The transmission of claim 1, wherein said first, second and third members of said first planetary gear set comprise a sun gear, a planet carrier assembly member and a ring gear, respectively, and said first, second and third members of said second and third planetary gear sets comprise a ring gear, a planet carrier assembly member, and a sun gear, respectively.

7. The transmission of claim 1, wherein said first, second and third members of said first planetary gear set comprise a planet carrier assembly member, a ring gear, and a sun gear, respectively, and said first, second and third members of said second and third planetary gear sets comprise a ring gear, a planet carrier assembly member, and a sun gear, respectively.

8. The transmission of claim 1, wherein said first, second, third and fourth torque-transmitting mechanisms comprise rotating clutches, and said fifth and sixth torque-transmitting mechanisms comprise brakes.

9. The transmission of claim 1, wherein said fifth forward speed ratio is a 1:1 ratio.

10. The transmission of claim 5, wherein said ring gear of said first planetary gear set has 85 teeth; said sun gear of said first planetary gear set has 55 teeth; said ring gear of said second planetary gear set has 81 teeth; said sun gear of said second planetary gear set has 21 teeth; said ring gear of said third planetary gear set has 81 teeth; and said sun gear of said third planetary gear set has 29 teeth.

11. The transmission of claim 6, wherein said ring gear of said first planetary gear set has 85 teeth; said sun gear of said first planetary gear set has 55 teeth; said ring gear of said second planetary gear set has 81 teeth; said sun gear of said second planetary gear set has 31 teeth; said ring gear of said third planetary gear set has 81 teeth; and said sun gear of said third planetary gear set has 49 teeth.

12. The transmission of claim 7, wherein said ring gear of said first planetary gear set has 81 teeth; said sun gear of said first planetary gear set has 41 teeth; said ring gear of said second planetary gear set has 81 teeth; said sun gear of said second planetary gear set has 23 teeth; said ring gear of said third planetary gear set has 81 teeth; and said sun gear of said third planetary gear set has 35 teeth.

13. The transmission of claim 1, wherein a sun gear of said second and third planetary gear sets are grounded in the first, second, third and fourth forward speed ratios.

14. The transmission of claim 1, wherein the transmission is shifted between the first and reverse speed ratios by engaging and disengaging brakes.

15. A multi-speed transmission comprising:

an input shaft;

an output shaft;

a planetary gear arrangement having first, second and third planetary gear sets, each planetary gear set having first, second and third members;

said input shaft being continuously interconnected with said first member of said first planetary gear set, and said output shaft being continuously interconnected with said second member of said second planetary gear set;

a first interconnecting member continuously interconnecting said first member of said second planetary gear set with said second member of said third planetary gear set;

a second interconnecting member continuously interconnecting said third member of said second planetary gear set with said third member of said third planetary gear set;

said third member of said first planetary gear set being continuously connected with a stationary member;

a first torque-transmitting mechanism selectively interconnecting said first member of said first planetary gear set with said first member of said third planetary gear set;

a second torque-transmitting mechanism selectively interconnecting said first member of said first planetary gear set with said first member of said second planetary gear set;

a third torque-transmitting mechanism selectively interconnecting said second member of said first planetary gear set with said second member of said third planetary gear set;

a fourth torque-transmitting mechanism selectively interconnecting said second member of said first planetary gear set with said first member of said third planetary gear set;

a fifth torque-transmitting mechanism selectively interconnecting said second member of said third planetary gear set with said stationary member; and a sixth torque-transmitting mechanism selectively interconnecting said third member of said third planetary gear set with said stationary member;

wherein a first forward speed ratio is established with the engagement of said fourth and sixth torque-transmitting mechanisms; a second forward speed ratio is established with the engagement of said third and sixth torque-transmitting mechanisms; a third forward speed ratio is established with the engagement of said first and sixth torque-transmitting mechanisms; a fourth forward speed ratio is established with the engagement of said second and sixth torque-transmitting mechanisms; a fifth forward speed ratio is established with the engagement of said second and first torque-transmitting mechanisms; a sixth forward speed ratio is established with the engagement of said second and fourth torque-transmitting mechanisms; and a reverse speed ratio is established with the engagement of said fourth and fifth torque-transmitting mechanisms.

16. The transmission of claim 15, wherein each of said first members is a ring gear, each of said second members is a planet carrier assembly member, and each of said third members is a sun gear.

17. The transmission of claim 15, wherein said first, second and third members of said first planetary gear set comprise a sun gear, a planet carrier assembly member and a ring gear, respectively, and said first, second and third members of said second and third planetary gear sets comprise a ring gear, a planet carrier assembly member, and a sun gear, respectively.

18. The transmission of claim 15, wherein said first, second and third members of said first planetary gear set comprise a planet carrier assembly member, a ring gear, and a sun gear, respectively, and said first, second and third members of said second and third planetary gear sets comprise a ring gear, a planet carrier assembly member, and a sun gear, respectively.

19. A multi-speed transmission comprising:
an input shaft;
an output shaft;
a planetary gear arrangement having first, second and third planetary gear sets, each planetary gear set having a ring gear, a planet carrier assembly member, and a sun gear;

said input shaft being continuously interconnected with said ring gear of said first planetary gear set, and said output shaft being continuously interconnected with said planet carrier assembly member of said second planetary gear set;

a first interconnecting member continuously interconnecting said ring gear of said second planetary gear set with said planet carrier assembly member of said third planetary gear set;

a second interconnecting member continuously interconnecting said sun gear of said second planetary gear set with said sun gear of said third planetary gear set;

said sun gear of said first planetary gear set being continuously connected with a stationary member;

a first torque-transmitting mechanism selectively interconnecting said ring gear of said first planetary gear set with said ring gear of said third planetary gear set;

a second torque-transmitting mechanism selectively interconnecting said ring gear of said first planetary gear set with said ring gear of said second planetary gear set;

a third torque-transmitting mechanism selectively interconnecting said planet carrier assembly member of said first planetary gear set with said planet carrier assembly member of said third planetary gear set;

a fourth torque-transmitting mechanism selectively interconnecting said planet carrier assembly member of said first planetary gear set with said ring gear of said third planetary gear set;

a fifth torque-transmitting mechanism selectively interconnecting said planet carrier assembly member of said third planetary gear set with said stationary member; and a sixth torque-transmitting mechanism selectively interconnecting said sun gear of said third planetary gear set with said stationary member;

wherein said six torque-transmitting mechanisms are engaged in combinations of two to provide at least one reverse speed ratio and six forward speed ratios.

20. The transmission of claim 19, wherein a first forward speed ratio is established with the engagement of said fourth and sixth torque-transmitting mechanisms; a second forward speed ratio is established with the engagement of said third and sixth torque-transmitting mechanisms; a third forward speed ratio is established with the engagement of said first and sixth torque-transmitting mechanisms; a fourth forward speed ratio is established with the engagement of said second and sixth torque-transmitting mechanisms; a fifth forward speed ratio is established with the engagement of said second and first torque-transmitting mechanisms; a sixth forward speed ratio is established with the engagement of said second and fourth torque-transmitting mechanisms; and a reverse speed ratio is established with the engagement of said fourth and fifth torque-transmitting mechanisms.

* * * * *